United States Patent [19]
Lavoie

[11] Patent Number: 5,214,095
[45] Date of Patent: May 25, 1993

[54] STABLE AQUEOUS EMULSION COPOLYMERS WITH SILOXANE FUNCTIONALITY

[75] Inventor: Alvin C. Lavoie, Warminster, Pa.

[73] Assignee: Rohm and Haas Company, Philadelphia, Pa.

[21] Appl. No.: 825,441

[22] Filed: Jan. 21, 1992

Related U.S. Application Data

[63] Continuation of Ser. No. 439,315, Nov. 21, 1989, abandoned, which is a continuation of Ser. No. 215,963, Jul. 7, 1988, abandoned.

[51] Int. Cl.$^5$ ............................................. C08L 43/04
[52] U.S. Cl. .................................. 524/806; 524/832; 524/837
[58] Field of Search ...................... 524/806, 832, 837

[56] References Cited

U.S. PATENT DOCUMENTS

| | | | |
|---|---|---|---|
| 3,294,725 | 12/1966 | Findlay et al. | 260/29.2 |
| 3,449,293 | 7/1969 | Burzymoki et al. | 260/46.5 |
| 3,575,910 | 4/1971 | Thomas | 260/29.6 |
| 3,706,697 | 12/1972 | Backderf | 260/29.2 |
| 3,729,438 | 4/1973 | Plesich | 260/29.6 |
| 3,898,300 | 8/1975 | Hillard | 260/827 |

FOREIGN PATENT DOCUMENTS 0153600  1/1984  European Pat. Off. .

OTHER PUBLICATIONS

Noll, Walter, "Chemistry of Technology of Silicone", Academic Press, New York 1968 pp. 9-15.

Primary Examiner—Ralph H. Dean, Jr.
Attorney, Agent, or Firm—Marvin J. Powell; Marc S. Adler

[57] ABSTRACT

Stable, aqueous emulsion copolymers with controllable siloxane crosslinking functionality are provided. These copolymers are prepared by a concurrent free radical and cationic initiated emulsion polymerization of at least one free radical initiatable monomer at least one linear siloxane precursor monomer, and at least one bifunctional silane monomer having both free radical polymerizable and silicon functional groups. The copolymers are useful in curable coatings, paints, caulks, adhesives, non-woven and ceramic compositions and as modifiers, processing aids and additives in thermoplastics, cements and asphalts.

14 Claims, No Drawings

STABLE AQUEOUS EMULSION COPOLYMERS WITH SILOXANE FUNCTIONALITY

This application is a continuation of application Ser. No. 439,315, filed Nov. 21, 1989, now abandoned, which is a continuation of application Ser. No. 215,963, filed Jul. 7, 1988 now abandoned.

BACKGROUND OF THE INVENTION

This invention relates to novel, emulsion copolymers having siloxane crosslinking functionality and more particularly to a concurrent free radical and cationic initiated aqueous emulsion polymerization process for preparing the copolymers. The copolymers are formed from at least one free radical polymerizable monomer, at least one monomer which yields a linear polysiloxane under aqueous cationic polymerization conditions ("linear siloxane precursor") and at least one monomer containing both a free radical polymerizable functionality and a silicon functionality capable of crosslinking by a siloxane condensation reaction.

As used herein "silane" shall include monomers capable of being formed into polymers having the structural formula $$(R_n SiO_{((4-n)/2)})_x$$

where R may be at least one of hydrogen, alkyl, alkenyl, alkynyl, cycloalkyl, cycloalkenyl, aryl, alkaryl, or aralkyl hydrocarbons, halogen and cyano derivatives of such hydrocarbons, and hydrocarbons containing ether, thioether, ester or thioester linkages, such as for example, methyl, ethyl, propyl, butyl, amyl, dodecyl, octadecyl, myricyl, vinyl, allyl, hexenyl, ethynyl, propargyl, cyclobutyl, cyclohexyl, cyclohexenyl, phenyl, naphthyl, xenyl, tolyl, xylyl, mesityl, t-butylphenyl, benzyl, 2-phenylethyl, 2-phenylpropyl, 2-chloropropyl, 3,3,3-trifluoropropyl, chlorocyclohexyl, bromophenyl, dicychlorophenyl, alphaalphaalpha-trifluorotolyl, mercapoethyl, mercaptopropyl, mercaptodecyl, cyanoethyl, cyanopropyl, hydroxypropyl, and the like as set forth in U.S. Pat. No. 3,575,910, referred to hereinafter; and where n has an average value of from 0.5 to less than 3, and where x is at least 2 or greater and is typically several hundred or greater. The disclosure will also refer to the nomenclature in the silicone art commonly used to identify the four basic types of alkoxy silanes or siloxane structural units: M,D,T and Q. These designations refer to the number, of Si-O bonds in the smallest repeating unit, (from 1 to 4) with, for example, Q refering to (4) silicate.

The incorporation of siloxane functionality into polymers is desirable for improving a variety of physical or chemical properties such as for example: improved weatherability as by increasing resistance to ultraviolet radiation, oxygen, water or solvents; thermal stability; or to improve or facilitate adhesion or bonding to selected substrates.

DESCRIPTION OF THE PRIOR ART

Workers in the field of conventional free-radical initiated emulsion polymerization have, therefore, attempted to prepare polymers incorporating siloxane functionality by utilizing alkoxy silanes or alkoxy silane derivatives. Attempts at preparing stable aqueous compositions containing siloxane functional emulsion polymers for use in curable formulations have not, however, been entirely successful. The primary problem has been caused by the reactivity of alkoxy silane or siloxane itself. This reactivity results in the formation of Si-O-Si crosslinks by the self-condensation of the siloxane functional groups.

U.S. Pat. No. 3,294,725 describes the aqueous emulsion polymerization of organo siloxanes and silcarbanes without using strong bases or strong mineral acids as the polymerization agent and without using a separate emulsifying agent. Instead the '725 patent describes emulsion polymerization using a combined surface active sulfonic acid catalyst such as for example dodecylbenzene sulfonic acid (DBSA). While the '725 patent is limited to the homopolymerization or organo siloxanes and silcarbanes, and the copolymerization of various types of organo siloxanes with each other or with silcarbenes, the disclosure of the use of the surface active catalyst, and particularly the in situ formation of the catalyst, is relevant to the preparation of the novel copolymers of the present invention.

The use of sulfonic acid surfactant-catalyst in cationic polymerization in anionic emulsions of organo siloxanes, and particularly trimethoxysiloxanes (T siloxanes) was subsequently published by the '725 inventors in the Journal of Polymer Science No. 27, pp 27-34 (1969) *Anionic Emulsion Polymerization of Siloxanes*, D. R. Weyenberg, D. E. Findlay and J. Cekeda and reprinted in *New Concepts in Emulsion Polymerization* edited by J. C. H. Hwa and J. W. Vanderhoff (1969) Interscience publishers.

U.S. Pat. No. 3,449,293 discloses the emulsion polymerization of organosilanes with unsaturated monomers, and more particularly of alkoxy silanes of the D,T or Q type with acrylic esters to produce solid polymers. These solid polymers are disclosed as being insoluble in common organic solvents. This insolubility indicates that the polymers are substantially crosslinked. The solid polymers are disclosed as possessing improved thermal stability as compared with non-crosslinked polymers formed from the polymerization of corresponding unsaturated monomers without siloxane incorporation. The emulsion copolymerization mechanism is described as being a simultaneous addition and condensation reaction initiated using conventional water soluble free radical initiator of the peroxide type, a redox initiator system and emulsifier.

U.S. Pat. No. 3,575,910 is also directed to the preparation of siloxane-acrylate copolymers and aqueous emulsions containing these polymer particles. The copolymers contain 25 to 90 wt. percent acrylate and 10 to 75 wt. percent of a siloxane copolymer formed from 45 to 65 mole percent of D type ($R_2 SiO$) monomer and 35 to 55 mole percent of T type ($RSiO_3/2$) monomer. Preferably the siloxane-acrylate copolymer is formed by a two stage emulsion polymerization typically involving first forming the siloxane copolymer and secondly polymerizing the acrylate monomers in the presence of, and onto, the siloxane copolymer. An alternate method (example 13) is disclosed by which the acrylate and siloxane monomers are simultaneously polymerizing using the stepwise addition of a free radical initiator and a buffer, but without the addition of a strong acid catalyst. This patent does not disclose or suggest the need for the cationic initiation of the siloxane monomers to form a siloxane-acrylate copolymer which does not prematurely crosslink.

U.S. Pat. No. 3,706,697 discloses a free radical initiated aqueous emulsion polymerization of 55 to 90 percent by weight of an acrylic ester, from about 0.5 to 6 percent by weight of gamma-methacryloxypropyltrimethoxy silane (MATS) or gamma-acryloxy-propyltrimethoxy silane and from about 9.5 to 44.5 weight percent of another copolymerizable free radical initiated monomer which does not have siloxane functionality.

U.S. Pat. No. 3,729,438 discloses emulsion polymers containing siloxane functionality formed from copolymers of vinylacetate and a vinyl hydrolyzable silane, such as for example, MATS or vinyl trimethoxy silane (VTMS) As in the '697 patent, while the copolymers are disclosed as being capable of post-crosslinking by means of the hydrolyzable siloxane functionality, the only means disclosed to attempt to retard premature condensation crosslinking is through pH control of the aqueous emulsion within the range of pH 3.5 to 6. The siloxane functionality, imparted to such copolymers by such vinyl hydrolyzable silanes as disclosed in the '697 patent and as prepared by the method disclosed in the '438 patent is, however, too reactive and substantial premature crosslinking of such siloxanes is unavoidable even by pH adjustment. Applicant believes this to be the case even when the less reactive VTMS is employed because the method of preparation disclosed in the '438 patent produces larger particles than those which are necessarily prepared according to the present invention. As discussed hereinafter, increasing the particle size has an adverse affect on (increases) pre-crosslinking.

The problem of excessive premature crosslinking of siloxane-containing emulsion polymers was addressed in *Feasibility of Using Alkoxy Silane—Functional Monomers for the Development of Crosslinking Emulsions*, T. R. Bourne, B. G. Bufkin, G. C. Wildman and J. R. Grave, Journal of Coatings Technology Vol. 54, No. 684 January 1982. The authors acknowledge the inability to suppress the hydrolysis-condensation reaction of alkoxy silanes to acceptable levels despite optimizing reaction conditions to provide stable colloidal systems. In order to provide crosslinkable functionality with greater resistance to hydrolysis the authors proposed using vinyl-type monomers with more sterically hindered alkoxy silane groups such as for example gamma-methacryloxypropylmethyldiethoxy silane ($\gamma$-MAPMDES). However, because of the inability to prevent time dependent and implacable hydrolysis of the (alkyl-O-Si) bond in an aqueous environment, the authors concluded that the use of such sterically hindered alkoxy silane monomers, including $\gamma$-MAPMDES, is limited mainly to applications requiring pre-crosslinked emulsion systems. The final conclusion of the paper was that if alkoxy-silane functional emulsions are to achieve the more ubiquitous status sought by industry for an advanced-generation system, then hydrolysis-resistant monomers or aqueous barrier techniques must be developed to prevent premature crosslinking of the alkoxy silane moiety.

Two references which rely on the crosslinking of siloxane moieties in emulsion copolymers are U.S. Pat. No. 3,898,300 and EPA 0153600. U.S. Pat. No. 3,898,300 discloses that the incorporation of crosslinked polyorganosiloxane particles into a styrenic copolymer matrix can improve impact strength to the polymer. EPA 0153600 discloses that emulsion polymerizing T siloxanes with film forming monomers can provide coatings with crosslinked polyorganosiloxane microparticles which can act as rheology modifiers for solvent based formulations.

Accordingly, despite a number of attempts to emulsion copolymerize siloxanes with conventional free radical polymerizable monomers, none of the prior attempts have succeeding in preparing stable, substantially non-crosslinked, siloxane-functional emulsion copolymers which can be made to crosslink when desired in a controllable manner.

It is, therefore, an object of the present invention to provide aqueous emulsion copolymers with siloxane functionality which are stable at ambient conditions and curable as desired.

It is an additional object of the invention to protect a sufficient percentage of the crosslinkable siloxane functional groups in an emulsion copolymer to make the copolymer more resistant to premature condensation crosslinking at ambient temperature without interfering with the ability of the polymer to be substantially crosslinked when needed.

SUMMARY OF THE INVENTION

Stable copolymers containing protected siloxane functionality are prepared by the concurrent free radical and cationic initiated aqueous emulsion copolymerization of a predominant amount of at least one free radical polymerizable monomer free of silicon functionality and a minor amount of at least two other monomers; at least one of which being a silane monomer containing both a free radical polymerizable functionality and a silicon functionality capable of self-condensation crosslinking ("bifunctional silane"); and where at least one other monomer is a cationic initiatable linear polysiloxane precursor which is present at a concentration sufficient to inhibit the self-condensation crosslinking of the bifunctional silane monomer at ambient conditions.

DETAILED DESCRIPTION OF THE INVENTION

The copolymers of the present invention are prepared by the concurrent free radical and cationic initiated aqueous emulsion polymerization of at least one monomer of each of the following three types: 1) a free radical polymerizable monomer free of silane functionality; 2) a bifunctional silane monomer containing a silicon functional group capable of crosslinking via siloxane condensation as well as a free radical polymerizable functionality, and 3) a linear siloxane precursor monomer which, when homopolymerized under cationic initiation, forms a linear polysiloxane.

The silane-free, free radical polymerizable monomer may be any of the various types of monomers conventionally used in emulsion polymerization provided that it is stable to strong acid polymerization conditions. This means that the monomer must be resistant to hydrolysis under the low pH conditions employed in the cationic copolymerization reaction. Suitable monomers of this type include ethylenically unsaturated monomers having one or more groups of the formula $-H_2C=C<$ such as, for example: styrene, alpha-methylstyrene, vinyltoluene; olefins and diolefins such as, for example; ethylene, propylene, isoprene, butadiene; vinylchloride, vinylidene chloride, acrylonitrile, acrylamide, methacrylamide, n-hydroxy methacrylamide, acrylic acid, methacrylic acid, (meth)acryloxy propionic acid, itaconic acid, maleic acid, monomethyl maleate, monomethyl fumarate, monomethyl itaconate, various ($C_1$–$C_{20}$) alkyl or ($C_3$–$C_{20}$) alkenyl esters and the like. Monomers, such as for example, vinylacetate, which hydrolyze readily at low pH conditions are not suitable for use in the invention. One or more of these hydrolytically stable, silicon-free, free radical polymerizable monomers may be used as the predominant monomer or monomers for preparing the copolymer. As used herein "predominant amount" refers to the combined concentration of all silicon-free, free radical polymerizable monomers used to prepare the copolymer, the concentration of said monomers being at least about 70 weight percent of all the monomers used in the copolymerization. The corresponding term "minor amount" shall refer to the balance of the concentration of all other monomers being at a concentration of about 30 weight percent or less on all monomers.

The bifunctional silane is a free radical polymerizable silane or siloxane precursor also referred to as a "reactive silane", having the general formula $R\ SiX_3, RR'\ SiX_2$, or $R\ R'_2\ SiX$ where R is a radical which contains a functional group capable of undergoing free radical polymerization, where R' may be the same as R or a hydrocarbon radical which may, but is not necessarily, capable of undergoing free radical polymerization such as, for example hydrogen, methyl, phenyl and the like, and where X is a hydrolyzable radical. Representative R substituents may include gamma methacryloxypropyl, gammaacryloxypropyl, vinyl or allyl. R may also include a functional group capable of reacting with free radicals and incorporating the funtionality into a polymer such as for example a chain transfer agent such as for example, mercaptopropyl. Representative X substituents may include acetoxy and alkoxy having 1 to 8 carbons such as for example; methoxy, ethoxy, isobutoxy, methoxymethoxy, ethoxymethoxy, and ethoxyphenoxy. Examples of representative reactive silanes include; methacryloxypropyl trimethoxy silane (MATS), acryloxypropyltrimethoxysilane; vinyltriethoxysilane (VTES), vinyltrimethoxysilane (VTMS) and allytrimethoxysilane.

The second silicon containing monomer, also referred to herein as the "linear siloxane precursor"; is any material which can be polymerized to form a linear polysiloxane under aqueous cationic polymerization conditions. Suitable examples of such linear siloxane monomers are cyclic dialkylsiloxanes such as, for example octamethylcyclotetrasiloxane ($D_4$), octaphenylcyclotetra siloxane, hexamethylcyclo-trisiloxane ($D_3$), decamethylcyclopentasiloxane ($D_5$) and derivatives thereof such as, for example; tetramethyltetraphenylcyclotetrasiloxane, and monomeric dialkyldialkoxysilanes such as, for example; dimethyldimethoxysilane, dimethyldiethoxysilane, diphenyldimethoxysilane, and methylphenyldimethoxysilane and the like. M type siloxane monomers such as for example, trimethylethoxysilane, trimethylacetoxysilane, or trimethylmethoxysilane may also be used as all of or a portion of the linear siloxane precursor component.

While the combined concentration of the reactive silane and linear siloxane precursor should be less than about 30 weight percentof all monomers, the linear siloxane precursor is typically present at a higher concentration by weight than the reactive silane when premature self-crosslinking is desired to be minimized. Although it should be noted that this invention is not intended to be limited by any theoretical chemical mechanism, the linear siloxane is believed to protect or act as a cap on the reactive silane functional groups. According to this theory in order to achieve complete capping of the reactive silane functional groups at equilibrium there must be a molar excess of the linear siloxane to the reactive siloxane of at least 3 to 1.

It is desirable from both an economical and, in most cases, a practical view to utilize as little of the reactive silane monomer as possible to prepare emulsion copolymers which are stable at ambient temperatures, curable when desired and which possess the improved properties associated with siloxane functionality. The lower concentration limit of the reactive silane monomer used is a function of the desired properties of the final product. The use of as low as about 0.1 wt percent reactive silane may result, in certain cases, in a useful product and accordingly, is about the lowest practical level useful for such copolymers. Accordingly, in such a system the lower limit on total concentration of the linear siloxane precursor monomers is about 0.4 percent. The ability of the emulsion polymer to remain substantially non-crosslinked at ambient temperatures decreases rapidly, however, as the concentration of the reactive silane increases even when the linear siloxane precursor protective monomer is employed. Increasing the concentration of the reactive silane monomer requires a corresponding increase in the concentration of the linear siloxane precursor monomer at the expense of the concentration of the predominant free radical silicon-free monomer. I have found it to be possible to prepare curable emulsion copolymers having siloxane functionality which are substantially non-crosslinked at ambient temperature when the reactive silane is employed at a concentration of about 1 weight percent on total monomers. As used herein "substantially non-crosslinked" refers to an emulsion polymer which has a soluble fraction as measured using a conventional organic solvent, such as for example tetrahydrofuran, of at least about 90 percent, or correspondingly that less than about 10 wt percent of the copolymer so formed has gelled or crosslinked during preparation. In some applications it may be more important, however, for the polymer to possess a certain level of siloxane functionality than for the copolymer to be substantially non-crosslinked. Nevertheless, I have found, however, that the use of the linear siloxane precursor comonomer can provide an emulsion copolymer with about three times greater soluble fraction than a corresponding copolymer formed from the same concentration (6 wt %) of the reactive silane but without the protective linear siloxane comonomer.

The stability of the copolymer or its resistance to substantial premature crosslinking at ambient temperature, is a function of the particle size diameter of the emulsion copolymer. I have found that the stability of the copolymer increases as the particle size of the emulsion copolymer is decreased. This is demonstrated in illustrative example 1 which follows.

The copolymers of this invention are prepared by an emulsion polymerization reaction employing a conventional water soluble radical initiator and a cationic polymerization initiator. I have found it to be preferable to conduct the polymerization of all the monomers utilizing both types of initiators simultaneously, referred to herein as "concurrent polymerization", rather than by polymerizing the three types of monomers in sequential or alternating polymerizations. Furthermore, I have found it preferable to utilize a strong acid surfactant-catalyst, such as, for example, dodecylbenzene sulfonic acid as the cationic initiator and emulsifier instead of using a strong acid catalyst and separate emulsifer. These strong acid surfactant-catalysts and a method for their in situ formation, as preferably used herein, is disclosed in U.S. Pat. No. 3,294,725. It is very important to conduct the polymerization at very low pH conditions, preferably at a pH as low as about pH2, and to neutralize the copolymer emulsion at the end of the polymerization to a pH in the range of from about pH6 to about pH8, with pH7 being preferred (See Example 3). This final neutralization has been found to be critical to prevent undesirable crosslinking of the emulsion copolymer during subsequent aging.

In addition, to the three basic types of monomers described previously, it is also possible to utilize polymerization chain transfer agents in a conventional manner to regulate the molecular weight of the copolymer. In this regard, it is also possible to utilize silicon containing monomers which are capable of acting a radical chain transfer agents such as, for example; mercaptopropyltrimethoxysilane (MPTMS) or mercaptopropylmethyldimethoxysilane (MPMDMS).

The emulsion copolymers of the present invention may be used in a wide number of end use applications. These applications include curable coatings such as, for example; roof mastics, vertical mastics, paints, textile coatings, foam, froth or crushed backcoatings, and ink vehicles; caulks and joint or gap filling compounds, adhesives such as, for example, pressure sensitive, contact, hot melt, heat sealable, laminating and electronics; binders such as, for example; non-woven binders for cellulosics, synthetics, or ceramics including glass, carbon, silicone carbide, silicone nitride, flocking binders, paper binders, saturants for paper, pigment printing binders, pad drying binders, textile finishes and sizing agents; as modifiers for cements in aqueous and dried powder form, coatings and penetrants for leather; as modifiers for thermoplastics and thermosets included extruded plastics, as modifiers for emulsified asphalts containing surfactants or clay stabilized asphalt systems; and as additives to various materials to improve adhesion or other surface properties including friction reduction and processabilty.

The following examples are provided to illustrate the preparation and use of the emulsion copolymers of this invention and are not intended, nor should they be construed, as limiting the scope or applicability of the invention as other specific compositions and specific uses falling within the scope of the invention are believed to be obvious to those ordinary skill in the art from this disclosure.

EXAMPLE 1—PREPARATION OF EMULSION COPOLYMER

An aqueous surfactant solution was prepared by dissolving 2.3 grams of a conventional alkyphenyl sulfonate surfactant (Sipon DS-4) (23%) in 350 grams of water. To the aqueous surfactant solution was added 246 grams butylacrylate (BA), 221 grams methylmethacrylate (MMA), 6 grams methacrylic acid (MAA), 47.7 grams octamethylcyclotetrasiloxane (D4), and 5.3 grams methacryloxypropyltrimethoxy silane (MATS) followed by rapid stirring to form an emulsion. This monomer emulsion was gradually added over a 2.5 hour period to a four neck reaction flask at 85° C. under nitrogen atmosphere; containing 690 grams water, and the following polymerization initiators: 7.9 grams dodecyl benzene sulfonic acid (DBSA) and 1.3 grams ammonium persulfate (APS). The reaction was continued and held at 85° C. for 30 minutes after the monomer emulsion addition was complete. The contents of the reaction vessel were then cooled to room temperature. The resulting copolymer (46.8 BA, 42 MMA, 1.1 MAA, 9.1 D4 and 1 MATS (wt %)) had a solids content of 30.5%, pH of 2.0 and avg. particle size diameter of 44 nanometers (nm)

EXAMPLE 2—PARTICLE SIZE EFFECT ON SOLUBLE FRACTION AND AGING STABILITY

Copolymers were prepared following the procedure set forth in Example 1 such that the free radical silicon-free monomer composition for the copolymer was 52 wt % BA, 46.7 wt % MMA and 1.3 wt % MAA. Comparative samples, formed with 1% MATS or 1% VTES without using the linear siloxane precursor monomer, were prepared for the purpose of comparison. In addition, copolymers formed using both reactive silane and linear siloxane precursor monomers were formed using 1 wt % MATS or VTES and 9 wt % D4 as indicated. The DBSA surfactant catalyst used in the reaction vessel in Example 1, as the cationic initiator, was replaced, as indicated, in certain comparative examples with DS4 emulsifier which had previously been used in Example 1 only to emulsify the monomers. The particle size of the polymers were measured using a Quasielastic Light Scattering Technique (or a Coulter Nano-Sizer). The soluble fraction of the emulsion was determined by using tetrahydrofuran (THF) solvent and separating and weighing the gelled and non-gelled portions. The aging test was performed by first adjusting the pH of the emulsion to pH 7 followed by remeasuring the soluble fraction (SF) in THF using the same technique after storing the emulsion for at least 10 days at 60° C. The results are shown in Table 1.

TABLE 1

| SAMPLE | SILOXANES REACTIVE | LINEAR | REACTOR SURFACTANT(S) OR CATIONIC(C) CATALYST, (WT % ON MONOMERS) | PARTICLE SIZE (NM) | EMULSION SF (%) | AGED (SF) (PH7) (%) |
|---|---|---|---|---|---|---|
| Comparative 1 | MATS | — | (C) 1.5 DBSA | 60 | 11 | 10 |
| 2 | MATS | D4 | (C) 1.5 DBSA | 60 | 97 | 92 |
| Comparative 3 | MATS | — | (S) 1.5 ES-4 | 56 | 63 | 24 |
| Comparative 4 | MATS | D4 | (S) 1.5 DS-4 | 51 | 46 | 24 |
| Comparative 5 | VTES | — | (C) 1.5 DBSA | 55 | 100 | 93 |
| 6 | VTES | D4 | (C) 1.5 DBSA | 55 | 100 | 96 |
| Comparative 7 | VTES | — | (C) 0.2 DBSA | 92 | 39 | 43 |
| 8 | VTES | D4 | (C) 0.2 DBSA | 93 | 26 | 50 |
| Comparative 9 | VTES | — | (S) 1.5 DS-4 | 60 | 94 | 91 |
| 10 | VTES | D4 | (S) 1.5 DS-4 | 60 | 91 | 96 |

TABLE 1-continued

| SAMPLE | SILOXANES REACTIVE LINEAR | REACTOR SURFACTANT(S) OR CATIONIC(C) CATALYST, (WT % ON MONOMERS) | PARTICLE SIZE (NM) | EMULSION SF (%) | AGED (SF) (PH7) (%) |
|---|---|---|---|---|---|
| Comparative 11 | VTES — | (S) 0.1 DS-4 | 100 | 32 | |

The results indicate that the presence of linear siloxane precursor comonomer (D4) provides significantly improved stability for emulsion copolymers containing reactive silane functionality (MATS) and that the soluble fraction of such copolymers formed using DBSA surfactant/catalyst are significantly better than those formed using the DS-4 surfactant. However, in the case where a less "reactive silane" VTES was used, the linear siloxane precursor D4 had no appreciable effect on the soluble fraction or aging stability of the emulsion. In the VTES containing systems the D4 is not, therefore, needed to provide aging stability, but is needed to give full property development. This is demonstrated in Table 1a below. This experiment demonstrates that cured films formed from the sample with VTES/D4 (Sample 1) has much better solvent scrub resistance relative to the VTES only sample 2

TABLE 1A

| Sample | Initial Sol. Frac. | Cured Films (150° C./30 min.) | | |
|---|---|---|---|---|
| | | Aged Sol. Frac. | Sol. Frac. | MEK Solvent Scrub Resistance (1 to 5, 5 no film damage) |
| 1 | 98 | 96 | 8 | 4 |
| 2 | 97 | 93 | 5 | 1 |

Sample 1 (46.8 BA/42 MMA/1.2 MAA/9 D4/1 VTES)
Sample 2 (51.5 BA/46.2/1.3 MAA/1 VTES)

EXAMPLE 3—HEAT AGE STABILITY AS FUNCTION OF pH

Samples of emulsion copolymers with siloxane functionality were prepared according to example 1 to contain 46.8% BA/42% MMA/1.2% MAA/9% D4/1% MATS. The samples were pH adjusted to pH in the range of 2-9.5 with a base such as for example, ammonia, sodium hydroxide or alkylamine, and the soluble fraction of the emulsion was measured as in Example 1 after storage over a 30 day period. The results are shown in Table 2.

TABLE 2

| | SOLUBLE FRACTION ON STORAGE | | |
|---|---|---|---|
| pH | INITIAL | 10 DAYS | 30 DAYS |
| 2 | 97 | 9 | — |
| 6 | 97 | 85 | 90 |
| 7 | 97 | 92 | 96 |
| 8 | 97 | 92 | 99 |
| 9.5 | 92 | 22 | 22 |

The results indicate that the emulsion copolymer remained substantially non-crosslinked for 30 days provided that pH of the emulsion was first adjusted to a pH of from about 6 to 8.

EXAMPLE 4—EFFECT OF REACTIVE SILOXANE CONCENTRATION

The following copolymers were prepared, neutralized with ammonium hydroxide to pH7, and soluble fractions were measured following the procedure set forth in Example 1. The results are shown in Table 3.

TABLE 3

| SAMPLE | COMPOSITION | SF |
|---|---|---|
| Comparative 1 | 52 BA/46.7 MMA/1.3 MAA | 100 |
| Comparative 2 | 51.5 BA/46.2 MMA/1.3 MAA/1 MATS | 11 |
| 3 | 46.8 BA/42 MMA/1.2 MAA/9D4/1 MATS | 89 |
| 4 | 50.3 BA/45.1 MMA/1.3 MAA/2.3 D4/1 MATS | 41 |
| 5 | 51 BA/45.9 MMA/1.3 MAA/0.7 D4/1.1 MATS | 16 |
| 6 | 41.6 BA/37.4 MMA/1 MAA/18 D4/2 MATS | not measured |
| 7 | 36.4 BA/32.7 MMA/0.9 MAA/27 D4/3 MATS | 25 |
| 8 | 46.8 BA/42 MMA/1.2 MAA/7 D4/3 MATS | 20 |
| 9 | 49.4 BA/44.4 MMA/1.2 MAA/2 D4/3 MATS | 20 |
| 10 | 46.8 BA/42 MMA/1.2 MAA/4 D4/6 MATS | 29 |
| 11 | 46.8 BA/43.2 MMA/9 D4/1 MATS | 68 |
| 12 | 36 BA/47.7 MMA/4.5 HEMA/1.8 MAA/9 D4/1 MATS | 71 |
| 13 | 36 BA/29.7 MMA/22.5 STY/1.8 MAA/9 D4/1 MATS | 87 |
| 14 | 90 STy/9 D4/1 MATS | 88 |
| 15 | 64.8 BA/19.8 AN/5.4 AOPA/9 D4/1 MATS | 84 |
| 16 | 88.2 BA/1.8 MAA/9 D4/1 MATS | not measured |
| 17 | 46.8 BA/42 MMA/1.2 MAA/9 D4/1 VTES | 98 |
| 18 | 79.8 EA/9 AN/1.2 MAA/9 D4/1 MATS | 90 |
| 19 | 46.8 BA/47.8 MMA/0.4 MAA/9 D4/1 MATS | 73 |
| 20 | 46.8 BA/40.5 MMA/2.7 IA/9 D4/1 MATS | 71 |
| 21 | 46.8 BA/39.6 MMA/3.6 MAA/9 D4/1 MATS | 77 |
| 22 | 51.7 BA/46.5 MMA/1.3 MMA/0.4 D4/0.1 MATS | 97 |
| 23 | 51.2 BA/46.0 MMA/1.3 MMA/1.3 D4/0.2 MATS | 98 |

EXAMPLE 5—NONWOVEN BINDERS

Two emulsion polymers of compositions 35.1 BA/54 MMA/0.9 MAA/9 D4/1 MATS and 39 BA/60 MMA/1 MMA were prepared as set forth in Example 1. The latexes were neutralized with ammonium hydroxide to pH=7. The latexes were then diluted to 12% solids with water. A polyester web was dipped into this solution and passed through a Birch Brothers Padder at 40 PSI. This impregnated polyester mat was dried and cured for 5 min. at 350° F. The siliconized polymer sample 1 performed superior to the unsiliconized control (comparative 2) with respect to elongation of the sample under load at elevated temperatures. This is an important property of a nonwoven binder for use in the preparation of polyester mats for asphalt roofing applications.

| Sample | Composition | % Elongation @ 350° F. Load = 5dN | 8dN |
|---|---|---|---|
| 1 | 35.BA/54MMA/.9MMA/9D4/1 MATS | 11.9 | 22.7 |
| Comparative 2 | 39 BA/60 MMA/1 MAA | 22.8 | 38.2 |

EXAMPLE 6—LEATHER TOPCOAT

A siliconized emulsion polymer of composition 67.5 BA/21.6 AN/0.9 AA/9 D4/1 MATS was prepared as set forth in Example 1. This latex was subsequently second staged with 10 wt % of a composition 50 wt % (butyleneglycoldimethacrylate)/50 wt % MMA and neutralized with ammonium hydroxide to pH=7. This emulsion polymer was used to prepare a topcoat formulation as outlined below. The topcoat was pressurized air sprayed at between 0.5 and 1.5 gm/sq. ft. dry weight. The leather was dried at 140° F. for 15 to 30 min. then air dried for 48 hrs. before testing.

| Topcoat Formulation | |
|---|---|
| Material | Parts by weight |
| Siliconized Acrylic Emulsion Polymer | 50 |
| Dulling Agent | 10 |
| Ammonia (aqueous 28%) | 1 |
| Leveling Aid | 3 |
| Primal ® XC Deep Black Pigment | 1 |
| Slip Aid | 3.5 |
| Water | 24 |

The above ingredients were mixed at room temperature and applied to a funiture upholstery leather which had been basecoated, with the formulation set forth below. The leather was basecoated at an add on of 1 to 3 gm/sq. ft. via a pressurized spray system and dried at 140° F. for 15 to 30 min the air dried for 2 hours. The basecoated leather was then coated with the below listed intermediate coating. The intermediate coating was pressurized spray coated at 0.5 to 1.5 gm/sq. ft. add on. The leather was then dried at 140° F. for 15 to 30 min. then air dried at room temperature for 2 hours.

| BASECOAT FORMULATION | |
|---|---|
| Material | Parts by weight |
| Water | 292 |
| Leveling Aid | 23 |
| Penetrator | 23 |
| Polymeric Binder Emulsion | 199 |
| Polymeric Binder Emulsion | 106 |
| Filler | 100 |
| Pigment | 257 |

| INTERMEDIATE COAT FORMULATION | |
|---|---|
| Material | Parts by weight |
| Water | 345 |
| Leveling Aid | 34 |
| Polymeric Emulsion | 345 |
| Pigment | 207 |

| INTERMEDIATE COAT FORMULATION | |
|---|---|
| Material | Parts by weight |
| Dull Finish | 69 |

The above top coated leather had a Veslic Wet Crock (1 Kg @ 10% damage) of 600 cycles, SATRA adhesion of greater than 950 gm/cm with a mixed base/grain failure mode, Newark Flex (60,000 cycles) no cracks, cold crack failure at 0° F., and Taber Wear Test (#10 wheel, 1 Kg, 1000 cycles) pass.

EXAMPLE 7—PAINT FORMULATION

A siliconized latex polymer (46.8 BA/42MMA/1.2 MAA/9D4/1 MATS) was prepared as set forth in Example 1 and neutralized with ammonium hydroxide to pH7. This latex polymer was used as the binder for a latex paint. Unit amounts of materials are listed in the table below (batch size is based on a 50 gal. run). TiPure ® R-900, Tamol ® 731, Foamaster ® VL, and propylene glycol are charged to a Cowles blender and stirred to produce a pigment grind. Water, latex binder, Texanol ® (coalesent), and Nuosept ® 95 (bacteriocide) were added to the pigment grind. The paint was then adjusted to 30.8 volume solids and a viscosity of 80 Krebs with a mixture of water and a (rheology modifier). The above paint when brushed onto a substrate had good flow and leveling.

| PAINT FORMULATION: | | |
|---|---|---|
| Material | Pounds | Gallons |
| Propylene Glycol | 36.00 | 4.16 |
| Tamol ® 731 (25.0%) | 6.81 | 0.74 |
| Foamaster ® VL | 0.5 | 0.07 |
| Ti-Pure R ®-900 | 133.82 | 4.01 |
| Water | 15.00 | 1.80 |
| Siliconized Latex Binder | 301.48 | 34.76 |
| Texanol ® | 5.32 | 0.67 |
| Water | 5.00 | 0.60 |
| Nuosept ® 95 | 1.00 | 0.11 |
| Foamaster 95 | 0.5 | 0.07 |
| Water Rheology Modifier | 25.13 | 3.02 |
| TOTAL | 530.56 | 50.00 |

PVC = 26.066
Volume Solids = 30.803
Lbs/Gal = 10.611
Weight Solids = 45.218

EXAMPLE 8—ADHESIVE

Two emulsion polymers one of composition 90 BA/2MAA (Latex 1) and one of 88.2 BA/1.8MAA/9D4/1MATS (Latex 2) composition were prepared as set forth in Example 1 and neutralized with ammonium hydroxide to pH7 and used as adhesives as set forth below.

One inch wide strips of $80^2$ cotton cloth were immersed in each of the wet adhesives for 10 seconds. As the strips were removed, excess adhesive was doctored off with glass rods. The strips were wet-laminated to $2' \times 6' \times \frac{1}{4}'$ glass plates, covered with untreated polyethylene film, and then rolled with a 2 lb. soft rubber roller (2 passes). The samples were divided into 4 series and dried. One series was dried at room temperature for 7 days. A second series was dried at room temperature for 7 days then baked @ 150° C. for 30 min. A third series was air dried for 6 days at room temperature then water soaked for 24 hours. The fourth series was air dried for 6 days, baked @ 150° C. for 30 min. then water soaked for 24 hours. All baked samples were cooled to room temperature before testing and before water soaking. Duplicates of all samples were prepared. The average values are listed in the table below. It is clear from this data that the siliconized adhesive (Latex 2) has superior adhesion to the glass substrate relative to the unsiliconized control (Latex 1), and this is especially evident in the water soaked samples.

| SILICONIZED ADHESIVES - ADHESION TO GLASS: | | | |
| --- | --- | --- | --- |
| Sample/ | Air Dried 7 Days | | Air Dried 6 Days/ 24 hr. H2O Soak |
| Condition | RT | 150° C./30 min. | RT | 150° C./30 min. |
| Latex 1 | 4.2 A | 3.7 A | DL | 1.3 A |
| Latex 2 | 4.5 A | 19.7 C | 6.2 A | 17.8 AFB |

A = Adhesive failure from substrate
C = Cohesive failure
AFB = Adhesive failure from cloth backing
DL = Delaminated from glass

EXAMPLE 9—CURABLE COATING

A polymer was prepared as described in example 1 having a composition (46.8 BA/42MMA/1.2MAA/9 D4/1MATS). This latex was neutralized to pH=7.0 with aqueous ammonia. Three films were prepared on glass projector slides using a 10 mil. drawdown bar. One film was allowed to dry overnight at room temperature. The second film was allowed to dry at room temperature (RT) for 30 min. then was baked at 150° for 30 min. The third film was dried and aged at room temperature for 60 days. At the end of the drying/baking cycle the films were removed from the glass slides (scrapped off using a razor blade). The films were then shaken in acetone overnight, filtered, and the amount of soluble material determined by removing the acetone by evaporation. The results are summarized in the table below. These results clearly show that crosslinked films can be obtained by either baking or prolonged ambient curing conditions.

| Composition | SF RT overnight | SF 30 min. RT 30 min. 150° C. | SF 60 days |
| --- | --- | --- | --- |
| 46.8 BA/42 MMA/ 1.2 MAA/9 D4/1 MATS | 77.6 | 8.1 | 2.7 |

The ambient cure of the siliconized latex polymers can also be catalyzed using many of the standard silcone catalysts (typically oil soluble salts of tin, zinc, and ziconium). An emulsion polymer of (46.8 BA/42-MMA/1.2MAA/9D4/1MATS) composition was prepared as described in example 1. The latex was neutralized to pH=7 with ammonium hydroxide. An emulsion of Tin(11)octoate was prepared by mixing 4 gm of surfactant (Abex 26-S) in 6 gm of water to this mixture was added 10 gm of tin(11)octoate and the mixture was then homogenized. A blend of the tin emulsion and the emulsion polymer was made (3% Tin solids/polymer solids). The blend was drawn (10 mill drawdown opening) onto a glass projector slide. Also drawn down as a control was the neat latex. The two films were dried at room temperature overnight. The soluble fraction of the films were measured as in the above example. The control film had a soluble fraction of 76.5%. The Tin(11)octoate catalyzed film had a soluble fraction of 4.1%. This clearly demonstrates that the metal salt catalyzed the ambient temperature crosslinking of the siliconized polymer.

What is claimed is:

1. A stable aqueous emulsion comprising a copolymer having resistance to premature crosslinking at ambient temperatures while containing crosslinkable silicon functionality, said copolymer having been formed by the concurrent free radical and cationic initiated polymerization of from at least about 70 weight percent of at least one free radical initiatable monomer free of silicon functionality and less than about 30 weight percent of at least two silicon-containing monomers where at least one of said silicon-containing monomers is a free radical initiatable, reactive bifunctional silane monomer and where at least one of said silicon-containing monomers is a cationically initiatable, linear siloxane precursor monomers, and further where the molar ratio of ($R_2SiO$) D units, obtained from said linear siloxane precursor, which are not bifunctional, to ($RSiO_{3/2}$) T units, which are all bifunctional, is greater than 3 to 1.

2. The stable aqueous emulsion copolymer of claim 1 comprising from about 70 to about 99.5 weight percent of said silicon-free, free radical initiatable monomer or monomers and from about 30 to about 0.5 weight percent of said silicon-containing monomers.

3. The stable aqueous emulsion copolymer of claim 1 comprising from about 70 to about 97 weight percent of said silicon-free, free radical initiatable monomer or monomers and from about 30 to about 3 weight percent of said silicon-containing monomers.

4. The stable aqueous emulsion copolymer of claim 1 wherein said reactive bifunctional silane monomer is present at a concentration of from about 1 to about 6 weight percent on total monomers.

5. The stable aqueous emulsion copolymer of claim 1 wherein said copolymer having resistance to premature crosslinking at ambient temperatures is a substantially non-crosslinked copolymer formed from about 70 to about 90 weight percent of at least one free radical initiatable, silicon-free monomer and from about 10 to about 30 weight percent of said silane and linear siloxane precursor monomers.

6. The aqueous emulsion of claim 1 comprising a pH in the range of from about pH6 to about pH8.

7. The aqueous emulsion copolymer of claim 1 comprising an average particle size less than about 100 nanometers.

8. The aqueous emulsion copolymer of claims 1, 2, or 3 where said reactive bifunctional silane is a T type silane selected from the group consisting of methacryloxy-propyltrimethoxysilane, acryloxypropyltrimethoxysilane, vinyltriethoxysilane, vinyltrimethoxysilane and allyltrimethoxy silane.

9. The aqueous emulsion copolymer of claims 1, 2 or 3 wherein said linear siloxane precursor is selected from the group consisting of cyclic dialkyl siloxanes, monomeric dialkyldialkyoxysilanes and methylphenyldimethoxysilane.

10. A non-woven binder comprising the aqueous emulsion copolymer of claim 1.

11. A leather coating comprising the aqueous emulsion copolymer of claim 1.

12. A paint formulation comprising the aqueous emulsion copolymer of claim 1.

13. An adhesive comprising the aqueous emulsion copolymer of claim 1.

14. A method of preparing a stable aqueous emulsion copolymer having crosslinkable siloxane functionality comprising a concurrent free radical and cationic initiated aqueous emulsion polymerization of at least one free radical polymerizable, silicon-free monomer, a linear siloxane precursor and a bifunctional silane wherein one group is activated by the cationic and the other group is free radical initiated at low pH conditions followed by neutralization of said emulsion copolymer by the addition thereto of a base to bring the pH of the emulsion within the range of pH 6 to pH 8.

* * * * *